United States Patent

Knoer

Patent Number: 6,076,842
Date of Patent: Jun. 20, 2000

[54] MUD FLAP SUPPORT SYSTEM

[76] Inventor: Neil Knoer, 20820 E. Sussex Ct., Parker, Colo. 80134

[21] Appl. No.: 08/811,518

[22] Filed: Mar. 4, 1997

[51] Int. Cl.$^7$ ........................................................ B62B 9/16
[52] U.S. Cl. ........................ 280/154; 224/42.31; 224/519; 224/924; 248/284.1; 280/851
[58] Field of Search ........................... 248/281.11, 284.1; 224/519, 42.31, 532, 924; 280/851, 154, 848, 847

[56] References Cited

U.S. PATENT DOCUMENTS

| | | | |
|---|---|---|---|
| 1,528,312 | 3/1925 | Taylor | 248/284.1 |
| 1,660,981 | 2/1928 | Williams | 248/284.1 |
| 1,780,400 | 11/1930 | Nelson | 248/284.1 |
| 4,009,744 | 3/1977 | Joslyn | 224/532 X |
| 4,541,646 | 9/1985 | Knowley | 280/851 |
| 5,071,098 | 12/1991 | Aldridge | 248/281.1 X |
| 5,301,999 | 4/1994 | Thompson et al. | 248/284.1 X |
| 5,690,260 | 11/1997 | Aikins et al. | 224/924 X |
| 5,820,004 | 10/1998 | Lane | 224/924 X |
| 5,833,254 | 11/1998 | Bucho | 280/851 X |

*Primary Examiner*—Michael Mar
*Attorney, Agent, or Firm*—Ramon L. Pizarro; Edwin H. Crabtree

[57] ABSTRACT

A support system for mounting mud flaps on the rear of a vehicle. The system includes a hub portion which has been adapted for mounting on a hitch at the rear of the vehicle and includes an adjustable support for attaching a mud flap support to the hub portion. At least one mud flap support is attached to the height adjustable support so that at least one mud flap may be supported from the mud flap support and the height of the mud flap relative to the vehicle may be adjusted through the height adjustable support.

5 Claims, 5 Drawing Sheets

MUD FLAP SUPPORT SYSTEM

BACKGROUND OF THE INVENTION (a) Field of the Invention

This invention generally relates to a mud flap system for use on the rear of a vehicle, and more particularly, but not limited to, a mud flap system which mounts to the male portion used on a receiver hitch and which allows adjustment of the height and size of the mud flap supports.

(b) Discussion of Known Art

The need for attaching mud flaps to the rear of a vehicle has long been recognized. However, the solutions to meet this need have required modifications to the vehicle or have permitted little adjustment to the size or position of the mud flaps.

For example, a device taught in U.S. Pat. No. 5,181,734 to Brown uses a cross member which mounts on a pivoting means to the trailer to be towed. Mud flaps mount on to the cross member of the Brown device. Thus the pivoting means used with brown device allows for correction of the angle of the mud flap support relative to the trailer as the towing vehicle goes through turns and the like. The Brown device, while presenting a solution to the need of keeping a proper alignment and position of the mud flaps relative to the trailer, does not address the problem associated with adjusting the position of the mud flaps in a vertical orientation. This shortcoming is important since many vehicles are now equipped with suspension systems that allow raising or lowering of the vehicle to adjust the vehicle's clearance depending on whether one is traveling over rough terrain or over smooth highways.

Another known mud flap support device is taught in U.S. Pat. No. 5,026,094 to Haddox. The Haddox device takes advantage of the structure used on some receiver hitch structures. While the Haddox device offers important advantages in that it makes efficient use of structure that may be found on the vehicle, it suffers limitations in that it is not truly universal and that it does not truly allow adjustment of the height of the flaps. Importantly, the Haddox device does not allow for convenient adjustment of the height of the flaps, so that the user may lower the flaps when driving over smooth highways and raise the flaps when traveling over rough mountain roads.

It has been found that it is important to provide a system that allows adjustment of the height of the mud flaps and that this need has yet to be met by known devices. The need for vertical adjustability arises out of the fact that the height of the truck varies in response to the load being carried by the truck. Thus adjustment of the flaps so that they clear the ground when truck is fully loaded will result in a height adjustment that is inadequate, or too high, for when the truck is not loaded.

Another flap support system can be found in U.S. Pat. No. 4,966,378 to Cook. The Cook invention uses a scissoring, cross bar arrangement to adjust the fore and aft position of the flap relative to the towing vehicle.

U.S. Pat. No. 4,319,764 to Whitaker teaches a mud flap mounting device which allows the mud flap supports to pivot in a fore and aft manner relative to a hitch attachment on the vehicle. Thus, while the Whitaker invention allows the mud flaps to flex and move in a fore and aft manner, the device does not address the problem of allowing a user to adjust the height of the mud flaps. Moreover, the Whitaker device attaches to a structural member of the hitch support. This type of arrangement requires permanent modifications to the hitch installation, and thus does not permit the convenient removal of the mud flap mounting system or change the vehicle on which the mounting system is being used.

Another mud flap support is taught in U.S. Pat. No. 4,221,432 to Van Remortel et al., which teaches a system which can be used with dump trucks. The Van Remortel device provides for pivoting and sliding of the flaps along a support near the rear portion of the truck. The sliding motion of the flaps allows the flaps to be moved away from an area where the flaps may be run over by the rear wheels of the truck. The Van Remortel device, however, does not provide for vertical adjustment of the flaps. Moreover, the Van Remortel system requires modifications to the truck body for permanent mounting of the system.

Yet another mud flap support system is taught in U.S. Pat. No. 3,877,722 to Conner, which teaches a mud flap apparatus which can attach to the frame of a truck and which can be adjusted for matching the width of the truck. However, the Conner device does not allow vertical adjustment of the position of the flaps. Also of importance is the fact that the Conner device is not readily mountable on commonly used trailer hitch attachments, such as the well known receiver type hitch which is found on many pickup trucks, sport-utility vehicles, and the like.

Still another system for supporting mud flaps on a vehicle is taught in U.S. Pat. No. 359,476 to Stivers. The Stivers device includes a yoke type attachment to secure a set of flaps to a beam on a vehicle. The Stivers device, like other known mud flap support systems, does not provide for vertical adjustment of the mud flap supports or height adjustments of the mud flaps themselves.

Thus, a review of known devices reveals that there remains a need for a mud flap support system that can be used on a variety of vehicles with a trailer hitch system, without having to modify the hitch system itself. Moreover, there remains a need for a mud flap support system that can be mounted on a receiver hitch system on a vehicle, and which allows adjustment of the flap height.

Still further, there remains a need for a mud flap support system that allows the user to adjust the height of the mud flaps quickly and easily.

There remains a need for a mud flap support system that allows height adjustment in order to compensate for the reduction of the heigh of the truck when carrying heavy loads.

Still further, there remains a need for a mud flap support system that can use interchangeable components that allow variation in the width of the mud flap support as well as in the height of the supports.

Moreover, there remains a need for a mud flap support system that may be mounted on the male portion of the receiver hitch, and thus allow use of the receiver hitch to carry a trailer while using the mud flap support system.

Additionally, there remains a need for a mud flap support system that is versatile, and thus allows configuration of the system to accept attachments such as bicycle racks, and support the bicycle rack while towing a trailer.

SUMMARY

It has been discovered that the problems left unanswered by known art can be solved by providing a mud flap support system that includes the following elements:

a) a hub portion adapted for mounting on the rear of the vehicle;

b) a height adjustable support for attaching a mud flap support to the hub portion; and c) at least one mud flap support attached to the height adjustable support means, so that at least one mud flap may be supported from the mud flap support, and the height of the mud flap relative to the vehicle be adjusted by the height adjustable support.

In a highly preferred embodiment of the invention the hub portion is adapted for mounting over hitch attachment on the back of a vehicle. More specifically, a highly preferred embodiment of the invention the hub portion is adapted for mounting over a receiver type hitch on the back of a vehicle. More specifically, the hub portion is adapted to be mounted on the male portion of an attachment having a male portion to be used with a receiver hitch.

The hub portion will preferably include a height adjustable support for attaching a mud flap support to the hub portion. The height adjustable support will preferably include an arm which may be selectively secured to the hub in order to adjust the position of the arm relative to the hub. In one embodiment of the invention the hub includes at least one slot which can slidably accept the arm. It is contemplated that a set screw or a pin may be attached through the slot in order to fix the position of the arm relative to the hub.

In a highly preferred embodiment of the invention the arm is a link that includes at least one attachment point at each end. In this embodiment the hub will also include at least one attachment point which mates with an attachment point on the arm. Thus in a highly preferred embodiment the hub includes a threaded hole which can accept a bolt. In this configuration the attachment point on the arm is simply a bolt hole, through which the bolt may be inserted and tightened against the hub through the threaded hole on the hub. Thus with this arrangement the angle of the arm relative to the hub may be adjusted by simply loosening the bolt, rotating the arm to the desired position, and then re-tightening the bolt.

In another embodiment the hub includes a short shaft with protrusions that mate with recesses in the attachment point on the arm. Thus with this embodiment the position of the arm may be adjusted by simply rotating the arm on the shaft to the desired angle and then tightening the position of the arm relative to the shaft by means of a bolt, a set-screw or the like.

Attached to the arm is at least one mud flap support. In a highly preferred embodiment the mud flap support includes a shaft portion with means for attachment to the arm at one end, and means for attaching a mud flap at the other end. The means for attachment to the arm may simply be a threaded section which fits into a mating hole in the arm. Thus the treaded section may be inserted into the hole in the arm and tightened against the arm by simply tightening the shaft against the arm by mounting a nut on the threads on the nut.

The mud flap support on the arm will preferably include a pair of plates or straps. One of the straps is welded or otherwise attached to the shaft. A mud flap may then be mounted over the welded plate or strap and the second plate or strap mounted over the mud flap, sandwiching the mud flap between the two plates or straps and holding the plates or straps against one another by means of fasteners.

In another embodiment of the invention the hub includes at least one slot which can slidably accept the arm. It is contemplated that a set screw or a pin may be attached through the slot in order to fix the position of the arm relative to the hub. It is contemplated that in this embodiment of the invention the arm may be integral with the shaft of the mud flap support. Thus the height of the mud flap may be adjusted by simply sliding the arm within the slot on the hub and then setting the position of the arm relative to the hub by means of a set screw, pin or the like.

It is contemplated that the hub of the instant invention provides a convenient support for other attachments, such as an attachment that supports a bicycle or equipment rack. Thus the disclosed system allows use as a mud flap support, a mud flap support and bicycle rack or equipment carrying support, and as a combination of the above while still being able to pull a trailer with the receiver hitch.

Thus it will be appreciated that the instant invention may be mounted on to the hitch portion on the rear of a vehicle without permanently modifying the vehicle.

It will also be understood that the instant invention will allow adjustment of the height of the mud flaps on the vehicle in order to allow the user to adjust the position of the flaps to meet the conditions of the road being traveled or changes in the height of the vehicle due to the load being carried by the vehicle.

It will also be understood that the instant invention will allow users to support mud flaps from a receiver hitch installation on a vehicle. Importantly, since the height of receiver hitch fittings can vary from vehicle to vehicle, an important new result achievable with the instant invention is the proper mounting and adjustment of a set mud flaps from a receiver hitch, regardless of the height of the receiver hitch.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

Figure 1:
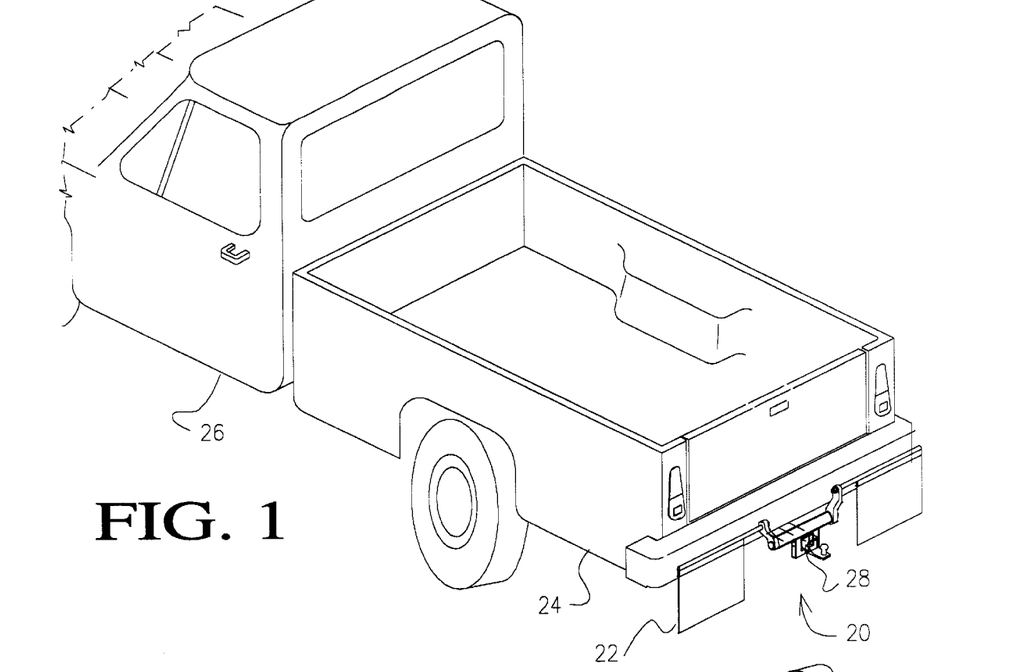
FIG. 1 is a perspective view showing the mud flap system mounted on a pickup truck.
Figure 3:
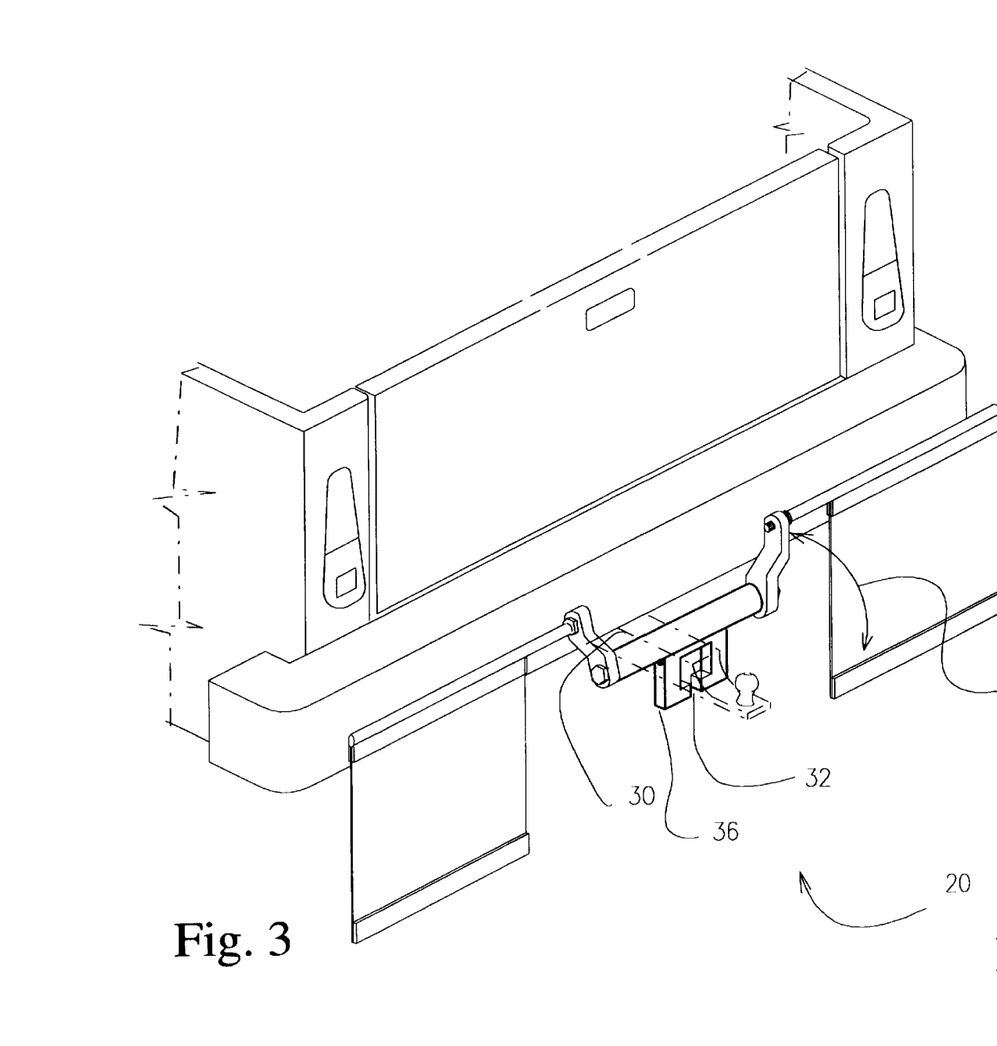
FIG. 3 is an enlarged view of the mounting of the system on the back of a pickup truck.

Turning now to FIGS. 1 and 3 where a support system 20 for supporting mud flaps 22 on the rear portion 24 of a vehicle 26 has been shown. The rear portion 24 of the vehicle 26 shown includes a receiver hitch 28. It is important to note that the receiver hitch contemplated to be used with the preferred embodiment includes a generally square female portion 30 which can accept a variety of attachments having a male portion 32, such as the male portion 32 on the hitch ball attachment 34 illustrated in FIG. 1.

Figure 2:
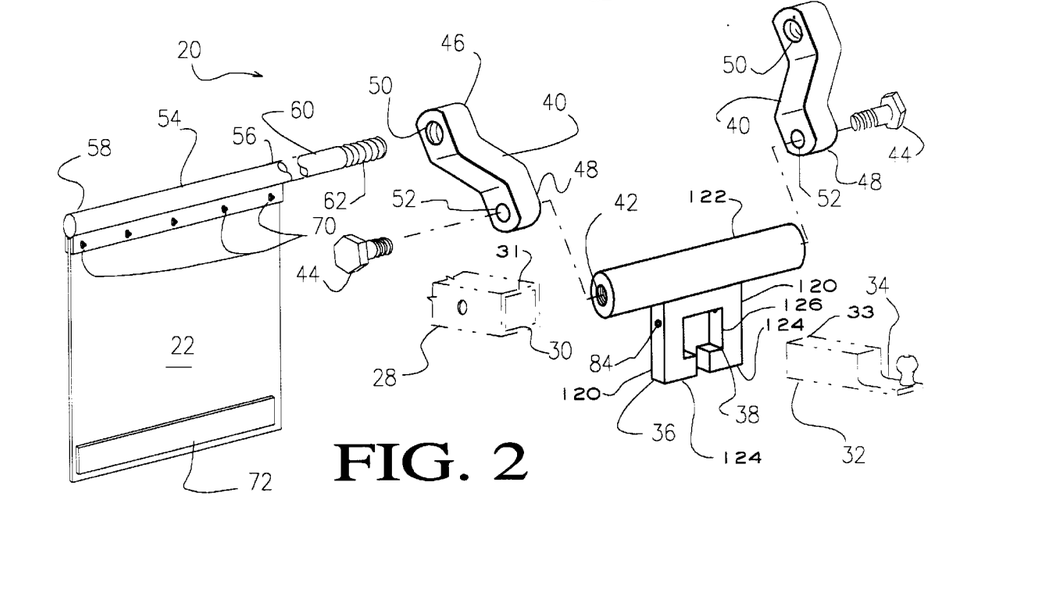
FIG. 2 is an exploded view illustrating the assembly of the components on a preferred embodiment of the invention.

Referring now to FIG. 2, which includes an exploded view of components of the system, it will be understood that the system includes a hub portion 36 which has been adapted for mounting on the rear of the vehicle 26. In a highly preferred embodiment of the invention, the hub portion 36 has been adapted for mounting over a hitch portion on a vehicle. In a preferred embodiment the hub portion 36 has been adapted for mounting over the male portion 32 on a receiver hitch. However, it is important to note that it is contemplated that the hub portion 36 of the preferred embodiment includes an aperture 38 therethrough for receiving the male portion 32 of an attachment that is to be used with the receiver hitch 28. The aperture 38 will preferably be formed from a pair of L-shaped portions, each L-shaped portion having a vertical leg 120 extending downwardly from a respective end of the upper horizontal portion 122 and a horizontal leg 124 extending towards a horizontal leg 124 of the other L-shaped portion to define a generally square opening 126 which is sized for slidably receiving therethrough only the tubular male portion 32 of the hitch support. It is contemplated that the horizontal leg 124 may be a single piece joining the vertical legs 120. Additionally, FIGS. 1 and 2 show that hitch support includes a square tubular female portion 30 extending from the rearward end 24 of the vehicle 26. Also, that the square tubular male portion 32 has a forward end 33 that is receivable within a rearward end 31 of the tubular square female portion 30.

The hub portion 36 is adapted to accept a height adjustable support means for attaching a mud flap support to the hub portion 36. As shown in FIG. 2, the hub 36 includes a horizontal support member 100, which includes a first end 102 and a second end 104, the first end 102 and second end 104 being along an axis 106. Additionally, a hitch attachment member 110 extends away from the horizontal support member 100 and serves as a means for supporting the hub 36 from the hitch structure. Additionally, in highly preferred embodiments shown in FIGS. 2, 3, 4, 4A, 4B, 5, and 6, the height adjustable support means includes a support arm 40 that mounts on the hub 36. The support arm 40 is preferably mounted on to the hub 36 by means for allowing pivotal attachment and adjustment of the arm 40 against the hub 36. Thus in the preferred embodiment illustrated on FIG. 2, the hub 36 includes a threaded aperture 42 which can accept a bolt 44 and can serve as an attachment point. The support arm 40 of the embodiment illustrated on FIG. 2 includes a first end 46 and a second end 48. The first end 46 includes a first fastener aperture 50 that serves as an attachment point and the second end 48 includes a second fastener aperture 52 which serves as a second attachment point.

Thus as shown on FIG. 2 the bolt 44 fits though the second fastener aperture 52 on the arm 40, and thus can be used to attach and adjust the angular position of the arm 40 relative to the hub 36, the bolt 44 serving as the axis of rotation for the arm 40 relative to the hub 36. Thus with this arrangement the angle of the arm relative to the hub may be adjusted by simply loosening the bolt, rotating the arm as indicated by the arrow 55 on FIG. 3 to the desired position, and then re-tightening the bolt 44.

As shown on FIGS. 2 and 3, the first fastener aperture 50 on the first end 46 of the arm 40 of the preferred embodiment is adapted for accepting at least one mud flap support 54. In a highly preferred embodiment, shown in FIGS. 2, 3, and 4, the mud flap support includes a shaft 56 with a first end 58 and a second end 60. The second end 60 of the shaft 56 includes means for attachment to first end 46 of the support arm 40. In a preferred embodiment this means for attachment to the first end 46 of the support arm 40 includes a threaded section 62 which fits into the first fastener aperture 50 on the first end 46 of the support arm 40.

While it is contemplated that the means for attachment to the first end 46 of the support arm 40 includes a threaded section 62, it is recognized that the second end 60 of the shaft 56 may include a splined end with a threaded tip, the splined end would mate wit a similarly splined portion in the aperture in the first end 46 of the support arm 40, so as to allow adjustment of the angle of the shaft 56 relative to the support arm by rotating the position of the mating splined portions and then tightening the splined portions with a nut over threaded portion at the second end 60 of the shaft 56.

Figures 4, 4A, 4B:
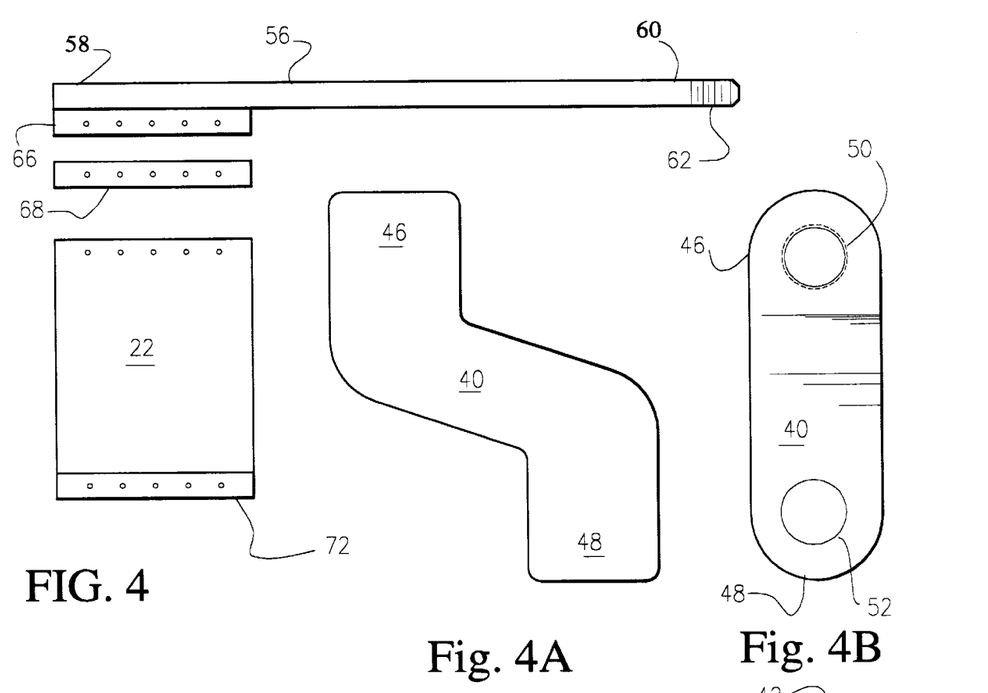
FIG. 4 is an exploded view showing the components of a preferred embodiment of the mud flap assembly and shaft portion used with the invention.
FIG. 4A is a side elevational view of an embodiment of the arms.
FIG. 4B is a side elevational view of the arm shown on FIG. 4A.
Figures 5, 6:
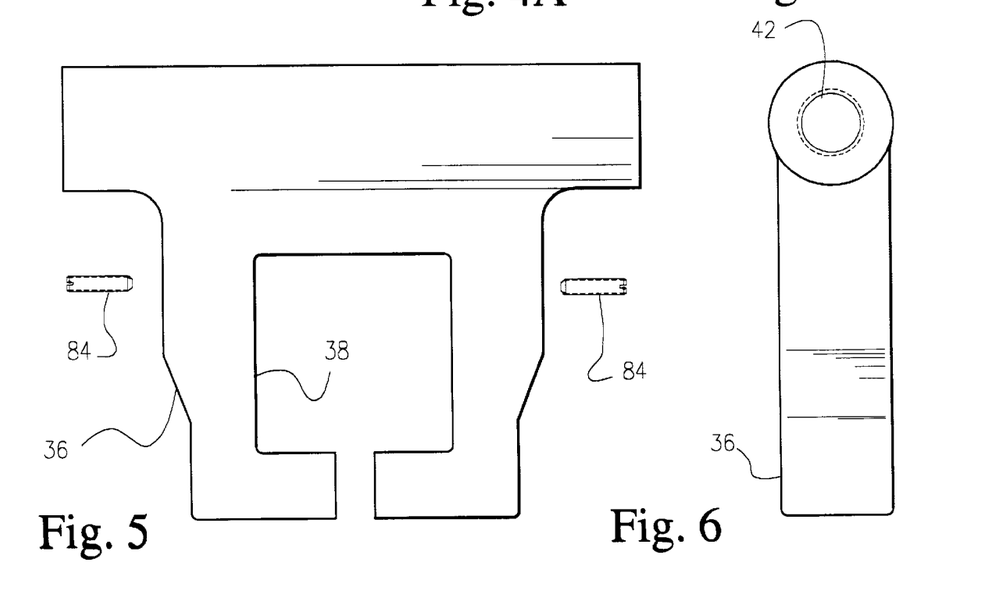
FIG. 5 is a plan view showing a highly preferred embodiment of a hub used with the invention.
FIG. 6 is a side elevational view of the hub shown on FIG. 5.

Also shown in FIGS. 2, 3, and 4 is that the first end 58 of the shaft 56 includes means for attaching a mud flap 22. The means for attachment of the mud flap 22 will preferably include a pair of plates or straps. One of the straps is preferably welded or otherwise attached to the shaft first end 58 of the shaft 56. Thus in the embodiment shown on FIGS. 2, 3, and 4 the welded strap 66 is attached to the first end 58 of the shaft 56. A mud flap 22 may then be mounted over the welded plate or strap 66 and then a second strap 68 may be mounted over the mud flap 22, sandwiching the mud flap 22 between the two straps and holding the plates or straps against one another by means of fasteners 70, as shown on FIG. 2. To keep the mud flap 22 in a vertical position while driving, a weight 72 is attached to an end of the mud flap 22.

Figure 3A:
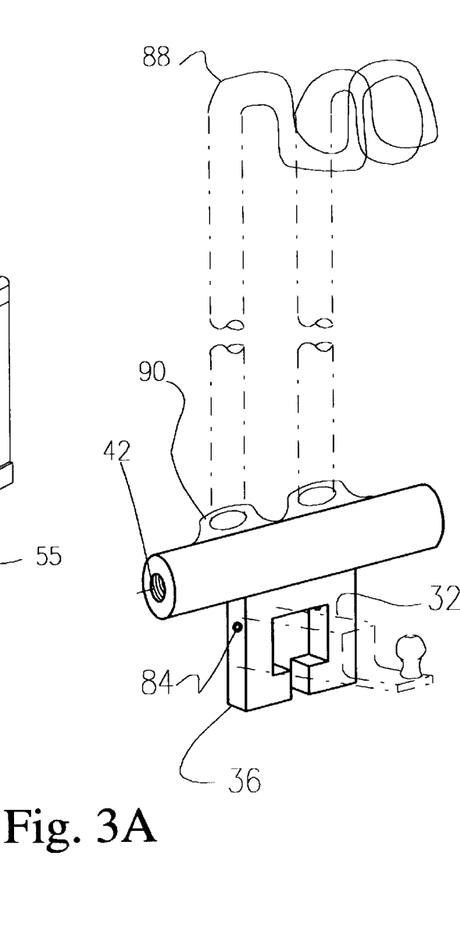
FIG. 3A is a perspective view of an embodiment of the hub including means for accepting a bicycle rack or other equipment support structure.

Turning now to FIG. 3A it will be appreciated that it is contemplated that the hub 36 may also include an accessory support means for accepting a bicycle rack or the like. Thus as shown on FIG. 3 the hub 36 includes an accesory support means which includes a pair of lugs 90 which have been adapted for receiving an accesory such as a bicycle rack 88. It should be noted that while a pair of lugs have been illustrated, it is contemplated that a single lug could be used to support the bicycle rack 88. Thus it should be appreciated that due to the use of the hub structure, as well as the accompanying structure taught herein, one may attach a set of mud flaps to a receiver hitch on the back of a vehicle and still be able to use the receiver hitch to tow a trailer and the like. Also, it is important to note that in place of the bicycle rack shown on FIG. 3A one could also use the hub to support a rack to carry tools, packages, or the like from the male portion of the receiver hitch without affecting the structure or utility of the male portion used with the receiver hitch. In other words, the user will still be able to tow a trailer, mount a set of mud flaps, and carry bicycles, packages and the like.

Figures 6A, 6B, 7, 7A:
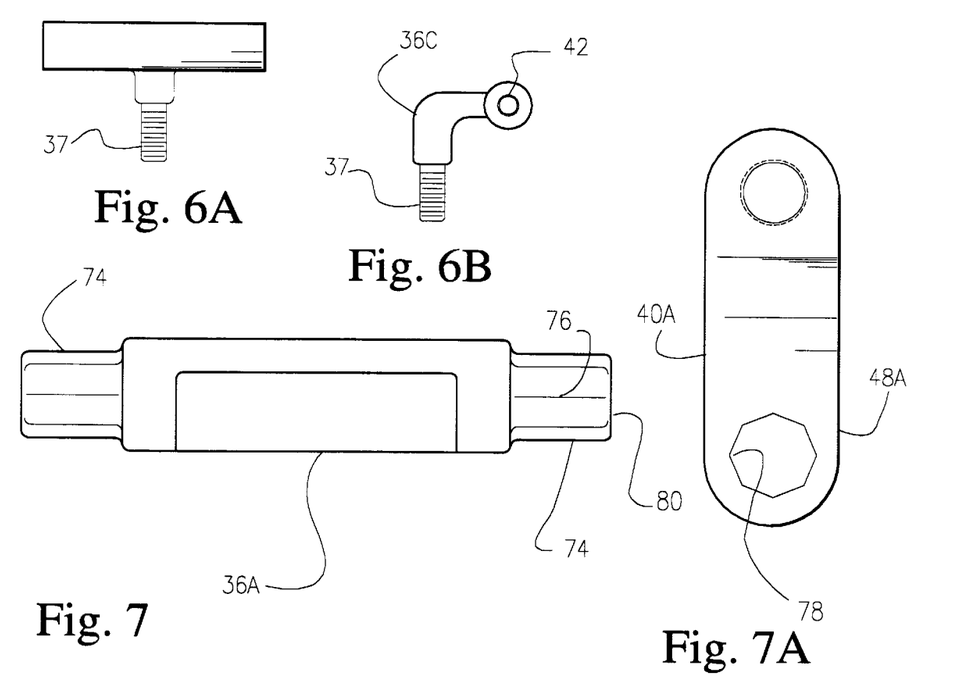
FIG. 6A is plan view of an embodiment of a hub that has been adapted for mounting on the mounting hole for a trailer ball on a trailer hitch.
FIG. 6B is a side view of the embodiment shown on FIG. 6A.
FIG. 7 is a top view of the embodiment of a hub shown on FIG. 8.
FIG. 7A is a side view of an arm used with the hub shown on FIG. 8.
Figure 8:
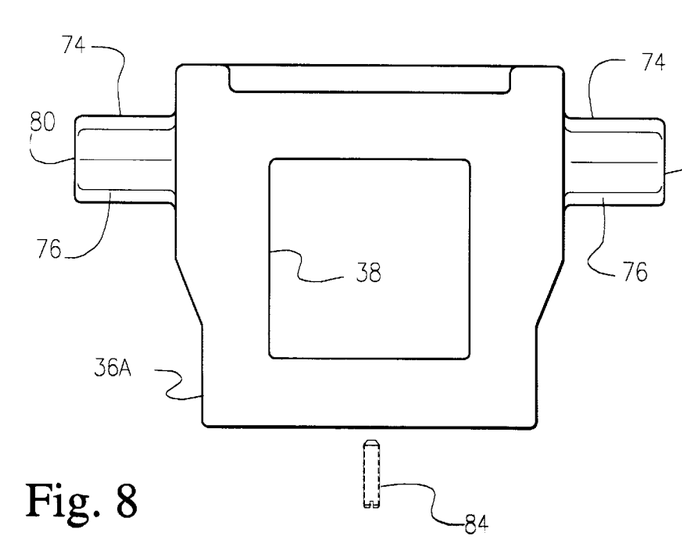
FIG. 8 shows another embodiment of a hub used with the invention.
Figure 9:
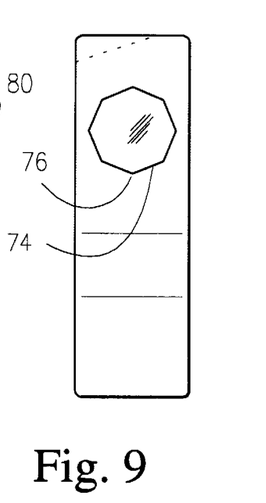
FIG. 9 is a side view of the hub shown on FIG. 8.
Figures 10, 11:
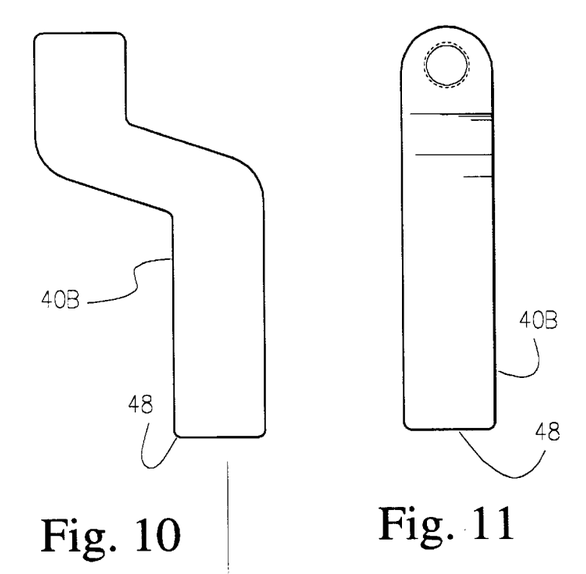
FIG. 10 is a side view of an arm used with yet another embodiment of the hub shown on FIG. 13.
FIG. 11 is a side elevational view of the embodiment shown on FIG. 10.

As shown on FIGS. 6A and 6B it is also contemplated that the hub portion 36C may be adapted to fit into an aperture designed for accepting a hitch ball on a trailer hitch. The ball on a trailer hitch is typically mounted by means of a threaded stud that bolts on to the trailer hitch. Therefore, the hub 36C may include a stud 37 to mount and bolt on to the bumper on the vehicle 26 or other similar structure that includes a hole used for supporting a hitch ball or the like. The hub 36C should include means for accepting a shaft 56 or arms 40 in order to support mud flaps as described herein.

To better appreciate the broad scope and spirit of the instant invention, a variation from the preferred embodiment is shown in FIGS. 7, 7A, 8 and 9, where the hub 36 includes a short shaft 74 with protrusions 76 that mate with recesses 78 at the second end 48A of the support arm 40A. Thus with this embodiment the position of the arm may be adjusted by simply rotating the arm on the shaft to the desired angle and then tightening the position of the arm relative to the shaft by means of a bolt, a set-screw or the like through the second end 48A of the support arm 40A or on the end 80 of the short shaft 74.

Additional embodiments of the invention have been shown on FIGS. 10 through 13. In these embodiments the arm 40B does not include an aperture for a fastener on the second end 48A of the support arm 40B. The absence of the aperture for a fastener is due to the fact that this embodiment is preferably used with a hub 36B as shown on FIG. 13. In this embodiment the hub 36B will preferably include at least one slot 82. The slot 82 is adapted for slidably accepting the second end 48A of the arm 40B as indicated by arrow 83. It is contemplated that a set screw 84 or a pin or other locking device may be attached through at least one opening 86 through hub 36B and into the slot 82 in order to fix the position of the arm 40B relative to the hub 36B.

Figure 12:
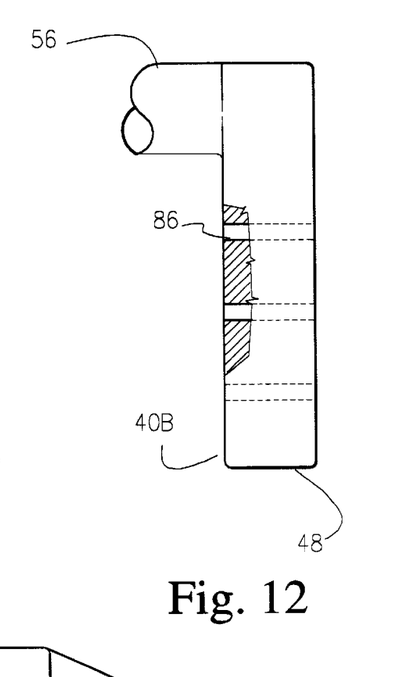
FIG. 12 is a side view of an arm with an integral shaft portion and including a breakout showing adjustment holes on the embodiment, the arm used with the embodiment of the hub shown on FIG. 13.
Figure 13:
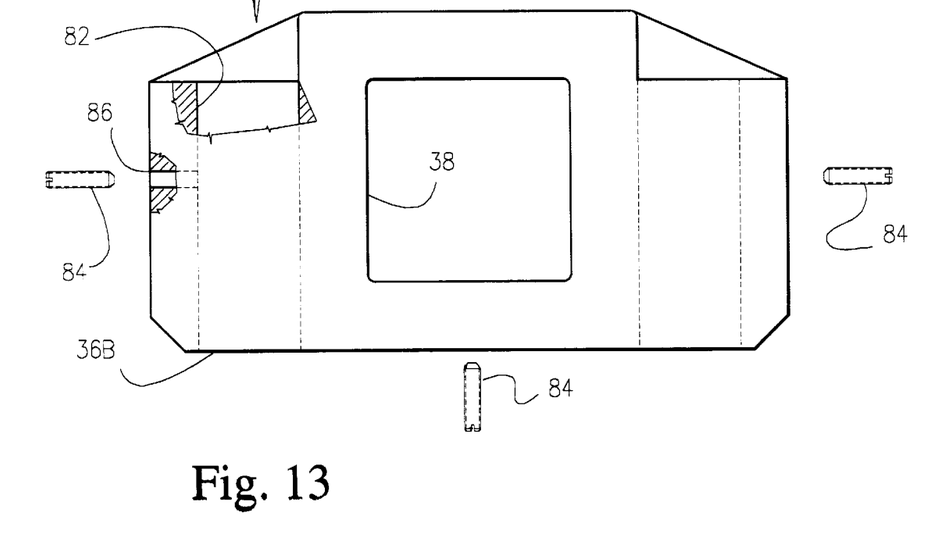
FIG. 13 shows an embodiment of a hub that can accept the arms shown on FIGS. 10, 11, and 12.

As shown on FIG. 12, it is contemplated that the arm 40B may also include at least one opening 87 to accept a pin, set screw or the like in order to fix the position of the arm relative to the hub once the arm has been inserted into the hub. Also shown on FIG. 12 it is contemplated the arm 40B may be integral with the shaft 56A that supports the mud flaps. This embodiment would obviate the need for fastening the shaft against the arm.

Thus, it is contemplated that in the embodiment illustrated on FIG. 12 the arm 40B may be integral with the shaft 56A of the mud flap support. Thus the height of the mud flap may be adjusted by simply sliding the arm 40B within the slot on the hub 36B and then setting the position of the arm 40B relative to the hub 36B by means of the set screw 84, or by means of a pin or the like.

It is also important to note that while it is contemplated that the instant invention be used with arms 40 to allow adjustment of the height of the mud flaps 22, an important result achieved with the components of the instant invention is that by using the components described herein one may choose to use the hub 36 as shown on FIG. 2 without the arms 40 by attaching the shaft 60 directly into the threaded aperture 42 on the hub 36. While this arrangement will not provide the benefit of vertical adjustability of the system, it will allow the user to mount flaps and still tow a trailer as discussed above. Also, the hub may include means for mounting a bicycle rack or other carrying device as described above and shown on FIG. 3A.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A support system for mud flaps on the rear of a vehicle, the vehicle having a hitch support including a square tubular female portion extending from a rearward end of the vehicle and a square tubular male portion having a forward end receivable within a rearward end of the tubular female portion, the system comprising:

a hub portion adapted for mounting on the rear of the vehicle, the hub portion comprising:
a horizontal support member having a first end and a second end, the first end and second end being along an axis extending traverse to a longitudinal axis of the hitch support; and
a hitch attachment member extending away from the horizontal support member, the hitch attachment member having an upper horizontal portion attached to a bottom surface of the horizontal support member and a pair of L-shaped portions, each L-shaped portion having a vertical leg extending downwardly from a respective end of the upper horizontal portion and a horizontal leg extending towards a horizontal leg of the other L-shaped portion to define a generally square opening which is sized for slidably receiving therethrough only the tubular male portion of the hitch support, the hitch attachment member being in abutting relationship with a rearward end of the tubular female portion of the hitch support when mounted to the tubular male portion;
a mud flap support rod for supporting a mud flap suspended therefrom; and
attachment means for attaching the mud flap support rod to said hub portion, the attachment means comprising an arm having a first end and a second end, the mud flap support rod being connected to the first end of the arm extending horizontally, the second end of the arm being selectively pivotally connected to one of the ends of the horizontal support member in a manner that allows selective pivotal movement of the arm about the axis of the horizontal support member for adjusting a vertical elevation of the mud flap support rod relative to a vertical elevation of the horizontal support member.

2. A support system according to claim 1 wherein said attachment means includes an aperture and a fastener for selectively tightening the arm against one of the ends of the horizontal support member.

3. A support system according to claim 1 wherein said hub includes at least one accessory support means.

4. A support system according to claim 3 wherein said accessory support means includes means for supporting a bicycle rack.

5. A support system for mud flaps on the rear of a vehicle, the vehicle having a hitch support including a square tubular female portion extending from a rearward end of the vehicle and a square tubular male portion having a forward end receivable within a rearward end of the tubular female portion, the system comprising:

a hub portion adapted for mounting on the rear of the vehicle, the hub portion comprising:

a horizontal support member having a first end and a second end, the first end and second end being along an axis extending traverse to a longitudinal axis of the hitch support; and a hitch attachment member extending away from the horizontal support member the hitch attachment member being adapted for mounting from the hitch support on the vehicle, the hitch attachment member having an upper horizontal portion attached to a bottom surface of the horizontal support member and a pair of L-shaped portions, each L-shaped portion having a vertical leg extending downwardly from a respective end of the upper horizontal portion and a horizontal leg extending towards a horizontal leg of the other L-shaped portion to define a generally square opening which is sized for slidably receiving therethrough only the tubular male portion of the hitch support, the hitch attachment member being in abutting relationship with a rearward end of the tubular female portion of the hitch support when mounted to the tubular male portion;

a mud flap support rod for supporting a mud flap suspended therefrom; and height adjustable support means for attaching the mud flap support rod to said hub portion, the height adjustable support means for attaching a mud flap comprising an arm having a first end and a second end, the mud flap support rod being connected to the first end of the arm and extending horizontally, the second end of the arm being selectively pivotally connected to one of the ends of the horizontal support member in a manner that allows selective pivotal movement of the arm about the axis of the horizontal support member for adjusting a vertical elevation of the mud flap support rod relative to a vertical elevation of the horizontal support member.

* * * * *